(12) United States Patent
Batlle (10) Patent No.: US 12,002,031 B2
(45) Date of Patent: Jun. 4, 2024

(54) IMAGE BASED MMS TRANSACTIONS MECHANISM

(71) Applicant: PAYPAL, INC., San Jose, CA (US)

(72) Inventor: Eduardo Alfonso Batlle, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 109 days.

(21) Appl. No.: 17/094,588

(22) Filed: Nov. 10, 2020

(65) Prior Publication Data

US 2021/0142313 A1    May 13, 2021

Related U.S. Application Data

(63) Continuation of application No. 14/644,098, filed on Mar. 10, 2015, now Pat. No. 10,832,235.

(51) Int. Cl.
*G06Q 20/32* (2012.01)
(52) U.S. Cl.
CPC .............................. *G06Q 20/3255* (2013.01)
(58) Field of Classification Search
None
See application file for complete search history.

(56) References Cited

U.S. PATENT DOCUMENTS

| | | | |
|---|---|---|---|
| 5,839,119 A | 11/1998 | Krsul et al. | |
| 2002/0099655 A1 | 7/2002 | Melchior et al. | |
| 2007/0203836 A1* | 8/2007 | Dodin | G06Q 20/223 705/44 |
| 2009/0192912 A1* | 7/2009 | Griffin | G06Q 20/322 705/26.1 |
| 2011/0137797 A1 | 6/2011 | Stals et al. | |
| 2012/0232981 A1* | 9/2012 | Torossian | G06Q 20/326 705/26.1 |
| 2012/0290478 A1* | 11/2012 | Crofts | G06Q 40/00 705/44 |

(Continued)

OTHER PUBLICATIONS

International Appl. No. PCT/US2015/063537, International Search Report and Written Opinion dated Feb. 3, 2016, 9 pages.

(Continued)

*Primary Examiner* — David P Sharvin
(74) *Attorney, Agent, or Firm* — Haynes and Boone, LLP (57) ABSTRACT

Embodiments relate to transactions using image based MMS solutions over a communication device. In an embodiment, a method includes receiving, by a payment provider server, from a buyer device, transaction information associated with a transaction between a buyer and a seller; wherein the seller provides a seller payment provider messaging endpoint identifier to the buyer along with the transaction information for use in processing the transaction. The method also includes transmitting, by the payment provider server, to the buyer device, message content comprising an image displayed on a user interface of the buyer device, the image comprising payment instrument information for use in connection with the transaction, wherein the buyer communicates information included in the message content to the seller payment provider messaging endpoint identifier. And the method includes processing, by the payment provider server, the transaction based on information included in the message content and the transaction information.

20 Claims, 4 Drawing Sheets

(56) References Cited

U.S. PATENT DOCUMENTS

2013/0024379 A1* 1/2013 Di Tucci ............ G06Q 20/3276
                                                        705/44
2014/0214661 A1  7/2014 Yankovich et al.
2014/0244493 A1  8/2014 Kenyon et al.
2015/0006391 A1* 1/2015 Agresta ................ G06Q 20/351
                                                        705/44

OTHER PUBLICATIONS

Toma, Cristian, "M-Payments Issues and Concept," Informatica Economica. 2012, vol. 16 Issue 3, p. 117-123 (Year: 2012).

* cited by examiner

IMAGE BASED MMS TRANSACTIONS MECHANISM

CROSS REFERENCE TO RELATED APPLICATIONS

This application is a continuation of U.S. application Ser. No. 14/644,098, filed Mar. 10, 2015, which is incorporated herein by reference in entirety.

TECHNICAL FIELD

Embodiments of the present disclosure generally relate to transactions over a communication device, and more particularly, to transactions using image based MMS solutions over a communication device.

BACKGROUND

In current standard markets, customers may frequently use cash or a transaction card such as a credit card, a debit card, a gift card, etc. to make payments in connection with transactions such as purchasing items, bidding, etc. In some cases, customers may use a mobile electronic computer device such as a smart mobile device (e.g., a smart phone, a tablet, etc.) to make payments in connection with transactions. In that regard, customers may download an application (App) on their mobile electronic computer device to enable payments over the mobile electronic computer device, which may offer greater convenience, simplicity and security for the customers.

While existing mobile electronic computing devices available in standard markets are generally adequate for their intended purposes including making payments, some customers may not wish to use an App to make payments. Also, mobile electronic computing devices such as smart mobile devices may not be available in non-standard markets such as populations in remote or underprivileged geographical locations or areas. For example, today, although some populations in remote geographies or underprivileged areas may have access to simple cellular telephones, they may not have access to mobile smart devices such as a smart phone, a tablet or the like, which have many more capabilities than a simple cellular telephone, for example, capabilities to run Apps that enable payments over the smart mobile devices. This lack of access to smart mobile devices in remote geographies or underprivileged areas may hinder transactions and may lead to decreased commerce.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one or more embodiments of the present disclosure, systems and methods facilitate transactions including making payments using an image based multimedia messaging service (MMS) transactions mechanism. In embodiments herein, transactions such as enabling payments may be facilitated by a remote server such as a payment provider server, for example, in situations where users do not have access to standard-market mobile computing devices such as smart mobile devices (e.g., smart phones, tablets, etc.). For instance, transactions may be facilitated in unreachable markets where users may only have access to simple cellular telephones that do not have capabilities that standard-market mobile computing devices may generally have, for example, capabilities for running applications (Apps) from a remote server such as payment provider Apps. Embodiments herein may also facilitate transactions in situations where a user may want to make a payment over a user device such as a smart mobile device, but does not want to use an application (App) from a remote server such as a payment provider App.

In an embodiment, a buyer (also referred to as a customer) may use a buyer-side MMS based payment solution that enables the buyer to conduct transactions such as making a payment without using an App, a physical transaction card, cash or the like. The buyer-side MMS based payment solution may be beneficial to buyers in various situations, for example, in a situation where a buyer does not wish to use a payment provider App to pay a seller that has a standard Point of Sale (POS) device. The buyer-side MMS based payment solution may also be beneficial in a situation where a buyer does not have access to a smart mobile device, and the buyer may want to pay using a payment provider to a seller that has a standard POS device. Buyers that do not have access to a smart mobile device, may include, for example, buyers that cannot afford to have a smart mobile device due to economic class, or buyers in remote geographies or underprivileged areas.

A process for a buyer-side MMS based payment solution may include the buyer registering a user device with a remote server, for example, a server associated with a payment provider, such that the payment provider may expose an MMS end point for transactions such as payments. The payment provider may then provide the buyer a payment provider MMS identifier (e.g., an MMS number), which the buyer may leverage or use in connection with transactions with a seller, for example, to make a payment for a product or service ("item"). As such, the buyer may pre-register a buyer device to use MMS payments so that the buyer's user device may be pre-authorized for MMS payments. Once registered, the buyer may use the MMS endpoint to make payments over the user device at the time of a transaction.

Advantageously, a user having a smart mobile device may conduct transactions such as purchasing items without having a physical transaction card or cash, or without having to use an App on the smart mobile device to pay a seller that has a standard POS device. Also, a user who has access to a simple user device such as a cellular telephone that supports MMS technologies, but does not have access to a smart mobile device, for example a user that cannot afford a smart mobile device due to economic class or because of geography, and who wants to pay using a remote server such as a payment provider server, may be enabled to conduct transactions such as purchasing items from a seller having a standard POS device. Also, embodiments herein may facilitate cashless transactions thus improving safety in communities or geographies where it may be dangerous to carry cash.

In another embodiment, a user device may be enabled to use an image based MMS certificate for transactions such as making purchases even where a seller does not have a POS device. In this case, payment issues may be overcome for small merchants that do not have the capital or ability to get a standard or conventional POS device. As described above according to an embodiment, a buyer may register a user device with a remote server such as a payment provider server and obtain a buyer payment provider MMS identifier. A seller may also register a user device with the payment provider server and obtain a seller payment provider MMS identifier. In one or more embodiments, the seller may activate an account for receiving MMS based payments over the seller's user device, and in other embodiments, the seller may simply receive confirmation (e.g., payment confirmation) via the seller's user device, or via an email communication, text, website, pop-up window, etc. As such, the seller may get an MMS endpoint assigned to the seller, which may allow the seller to process MMS payments.

Advantageously, one or more embodiments herein may facilitate transactions including providing secure payments via a remote server, for example a payment provider server, in standard markets where, for instance, buyers may not want to use a payment provider application (App) to pay sellers, or in non-standard markets where buyers may not have access to mobile electronic computer devices such as smart mobile devices. In addition, methods and systems according to embodiments herein may be advantageous in markets where sellers do not have a POS device or normally transact in cash, for example, in micro markets such as flea markets, farmer's markets, carnivals, etc., or in previously unreachable markets or developing economies where sellers may not have the capital or resources to purchase or have a POS device. Conveniently, transactions may be conducted between a buyer and a seller with or without a seller having a Point of Sale (POS) device.

In an embodiment, transactions may be facilitated including processing payments by a remote server such as a payment provider server, for example, implemented by PayPal®, Inc. or eBay®, Inc. of San Jose, California, USA.

Figure 1:
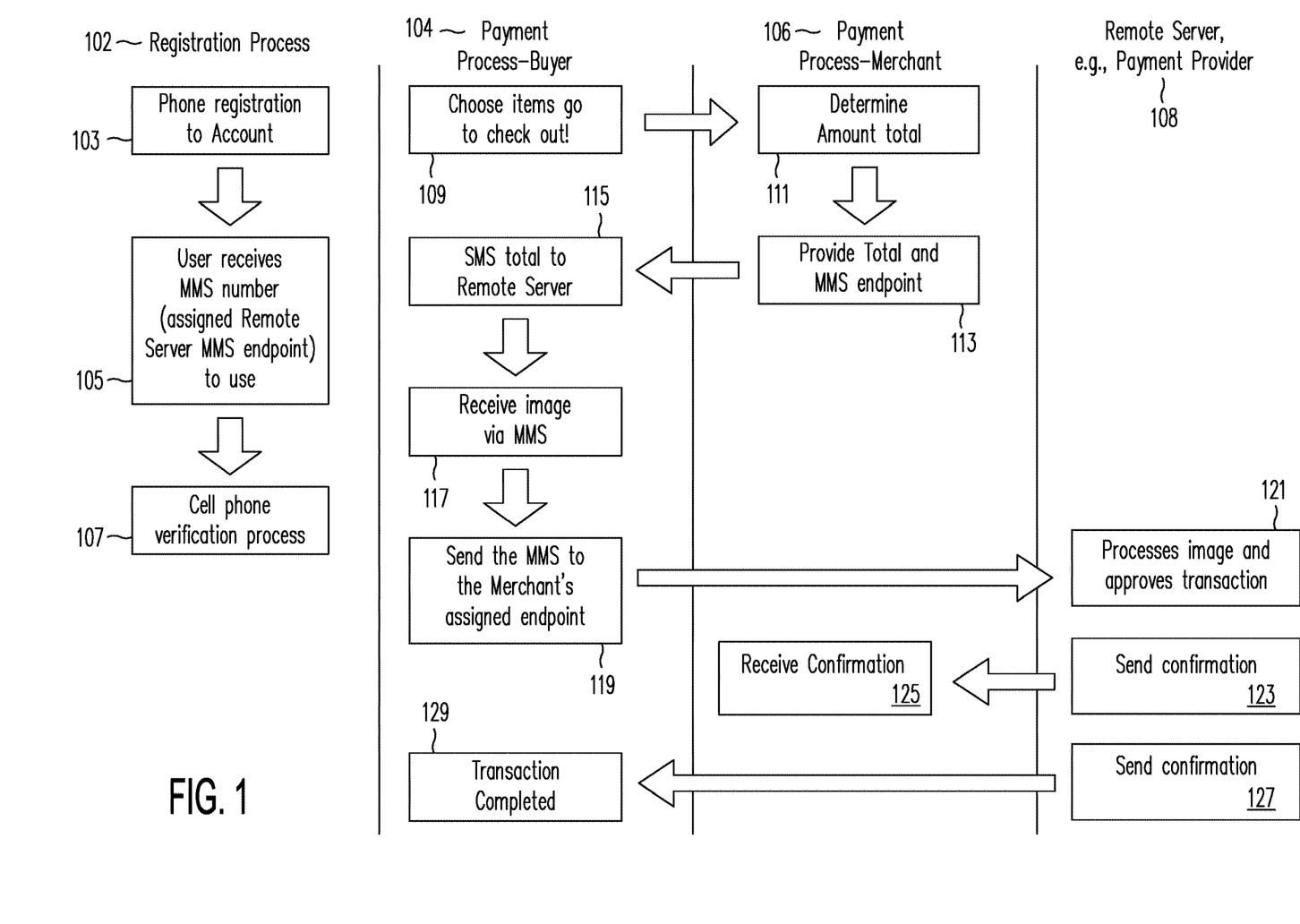
FIG. 1 is a flow diagram illustrating an MMS transaction process according to an embodiment of the present disclosure.

Referring now to the drawings wherein the showings are for purposes of illustrating embodiments of the present disclosure only, and not for purposes of limiting the same, FIG. 1 is a flow diagram illustrating an MMS transaction process according to an embodiment of the present disclosure.

According to one or more embodiments, transactions including secure payments may be facilitated in previously unreachable markets such as geographies and populations without access to mobile electronic computer devices such as smart mobile devices (e.g., smart phones, tablets, etc.). In other embodiments, an image based MMS certificate may be used for transactions such as purchases in various situations, for example, in standard market situations where a user may not want to use an application (App) on a user device, for example, a payment provider App for making payments. Also, transactions may be facilitated in situations where a seller may not have a POS device or normally transacts in cash, for example, in micro markets such as flea markets, farmer's markets, carnivals, etc., or in developing economies where merchants may not have the capital to purchase a POS device. Advantageously, payment issues may be solved for small sellers that do not have the capital or ability to have a standard or conventional POS.

In FIG. 1, an MMS transaction process may start with a registration process 102. In an embodiment, a buyer (also referred to as a customer) may register a user device associated with the buyer with a remote server such as a payment provider server. In another embodiment, the seller (also referred to as a merchant) may also register a user device associated with the merchant with the remote server such as a payment provider server associated with a payment provider.

In block 103, in an embodiment, the buyer may register a user device with the remote server (e.g., associated with the payment provider) such that the payment provider may create an account associated with the buyer. In an embodiment, the payment provider is a known MMS endpoint. In another embodiment, the merchant may also register a user device with the remote server and obtain an MMS endpoint assigned to the merchant, which may activate a merchant's account with the payment provider and enable the merchant to process MMS transactions including payments.

In various embodiments, the user device may refer to a standard-market mobile electronic computer device such as a smart mobile device (e.g., a smart phone, a tablet, etc.) configured to perform various standard smart device functions such as downloading, installing and running Apps, location services such as GPS, etc. In other embodiments, the user device may refer to a device that does not have one or more capabilities normally found in standard market mobile electronic computing devices such as downloading, installing, or running Apps, GPS, etc. For example, the user device may be a cellular device such as a cellular phone that can support messaging such as text messaging and MMS.

In various embodiments, a user (e.g., a buyer or a merchant) may register a user device with a remote server such as a payment provider server in various manners, for example, online via a website, via regular postal mail, via a telephone call, via messaging, etc., or in some embodiments, the user device may be preconfigured to interact, communicate or transact with the remote server.

In block 105, in an embodiment, the buyer may receive, e.g., via the user device, an MMS identifier such as an MMS number (e.g., a 5-digit number or the like), an icon, a code, a logo, a password, etc., from the remote server associated with the payment provider for use in connection with MMS transactions. The received MMS identifier may be assigned to correspond to a payment provider MMS endpoint identifier (e.g., an MMS end point number), which indicates what identifier (e.g., number) to use for pre-authorization of payments. In another embodiment, the merchant may also receive, e.g., via the merchant's user device, an MMS endpoint assigned to the merchant by the remote server associated with the payment provider such that the merchant may receive MMS based payments.

In block 107, the user device associated with the buyer or the merchant may go through a verification process. In that regard, a buyer's user device may be verified such that MMSs received from the buyer's user device including the assigned MMS identifier may be processed for pre-authorizations and payments in connection with transactions. The merchant's user device may be verified such that the merchant may receive MMS based payments.

Once registered for example in accordance with registration process 102, the buyer's user device may be used in connection with transactions such as making payments using an MMS end point (for example a payment provider MMS endpoint, or a registered merchant MMS endpoint) to pay at the time of a transaction. For example, once registered, the buyer may use an MMS endpoint to pay at the time of a purchase via the buyer's user device.

At the time of a transaction, the process may involve a buyer payment process 104 associated with a buyer or buyer device, a merchant payment process 106 associated with a merchant or merchant device, and a remote server 108 associated with a payment provider server or device.

In block 109, a buyer may choose one or more items in connection with a transaction. For example, the buyer may select an item(s) offered by a seller or merchant online or at a physical location of the seller or merchant. The buyer may then proceed to check out and pay for the selected item(s). Checkout may be available online, for example, via a shopping cart including transaction details displayed on a seller's website on the buyer device, or it may be at a physical POS device or terminal of a seller's location such as a store, or at any other physical location where sellers may offer items for sale, for example, flea markets, farmer's markets, carnivals, etc., where the seller may or may not have a POS terminal or device.

In block 111, the seller determines a total amount in connection with the transaction, for example, a total purchase price or amount owed for the item(s) selected by the buyer.

In block 113, the seller or merchant may provide the total amount owed for the item(s) selected by the buyer, for example, the merchant may present the total amount online such as via a shopping cart displayed on a seller's website on the buyer device, or at a physical POS device, or the seller may simply tell the buyer the total amount. In addition, in embodiments where the seller has a registered merchant MMS endpoint, the seller may provide the merchant's MMS identifier as an MMS endpoint for receiving payments.

In block 115, the buyer may communicate, e.g., send, the total amount via the buyer's user device, for example via messaging text (SMS) or MMS, to the remote server, i.e., the payment provider server. The payment provider may pre-authorize a payment in connection with the transaction for the total amount owed.

In block 117, the buyer device may receive message content including an image from the remote server, i.e., the payment provider server via MMS communications.

In one embodiment, a buyer-side MMS transaction process may take place. In the buyer-side MMS transaction process, the remote server, e.g., the payment provider server, may generate a temporary account number and associated data (e.g., a token). The payment provider server may then generate an image that may represent a payment instrument such as a standard transaction card, for example a credit card, wherein the generated account number information is shown on the transaction card. The buyer device may then receive and display the image having the generated payment instrument, e.g., transaction card, as will be described next according to the embodiment of FIG. 2.

Figure 2:
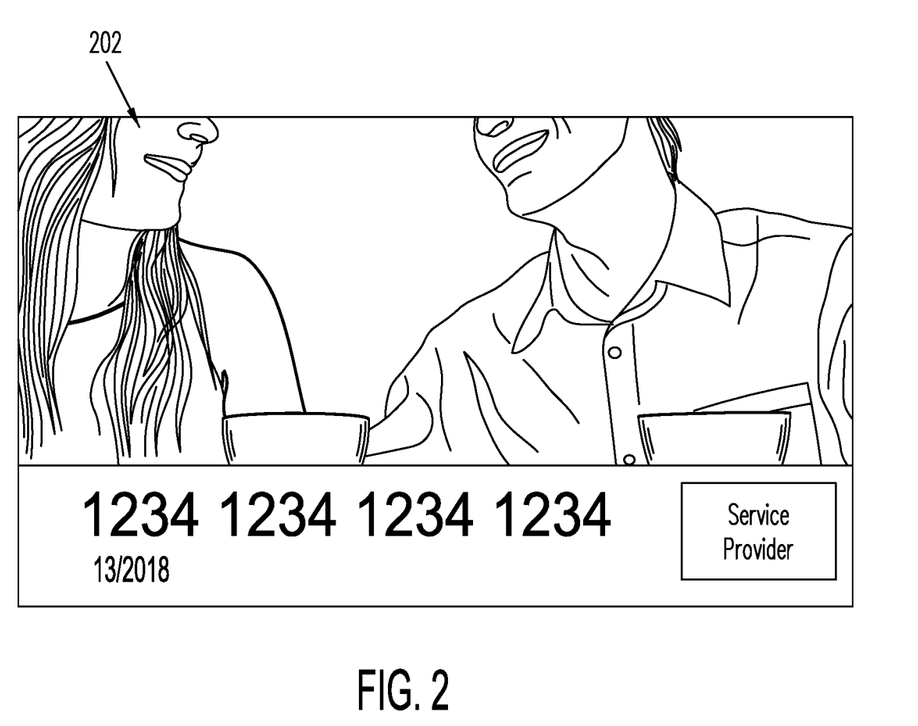
FIG. 2 is an example illustrating message content including an image of a transaction card that may be generated by a remote server according to an embodiment of the present disclosure.

FIG. 2 illustrates an example of a message content including an image of a transaction card that may be generated by the remote server, e.g., payment provider server according to an embodiment. The remote server, e.g., payment provider server or other service provider server, may send an image representative of the transaction card to the buyer device such that the image is displayed on at least a portion of a user interface 202 of the buyer device. In this example of FIG. 2, the image includes general transaction card information such as an account number illustrated as "1234 1234 1234 1234", an expiration date illustrated as 13/2018, and a transaction card issuer illustrated as "Service Provider". A service provider may be any appropriate issuing entity such as PAYPAL, another financial institution, etc. The image of the transaction card may occupy the entire area of user interface 202, or only a portion (e.g., half, a quarter, etc.) of an area of user interface 202. Also, the image may be displayed on user interface 202 of buyer device temporarily. For example, the buyer may use the image of the transaction card displayed on user interface 202 in connection with transactions conducted within a predetermined amount of time, for instance, within an hour, 2 hours, 12 hours, etc. of the image being received by the buyer device. The time limits may be based on settings set by the buyer or the remote server, for example. In an embodiment, after the predetermined amount of time passes, the image may disappear or is hidden from the display of user interface 202. It should be noted that in one or more embodiments, an amount was pre-authorized such that the transaction card may be valid for only one charge for the pre-authorized amount within the expiration time. In other embodiments, the transaction card may be valid for one or more charges up to the pre-authorized amount within the expiration time.

In an embodiment for a buyer-side MMS transaction process, after the buyer device receives the message content, for example including the image from the payment provider server, the buyer may use the image of the transaction card displayed on user interface 202 of the buyer device as a normal transaction card for conducting a transaction such as making a purchase at a merchant's POS. For example, the buyer may use the transaction card at a merchant's online POS, or the buyer may tell details of the image, or physically show the image of the transaction card displayed on the buyer's device to a merchant at a POS location such as a store or at any physical location where the merchant generally conducts business. In a merchant's physical location, for example, the merchant may enter the transaction card information such as the account number, expiration date, etc., in to the merchant's current POS device or system as usual. As described above according to an embodiment, use of the received image including payment instrument information may be time-limited, for example, based on buyer or remote server settings, e.g., an hour. Advantageously, in some embodiments, a buyer having a smart mobile device such as a smart phone or tablet may use this process of getting an image including an account number and other associated data for example in the form of a transaction card displayed on user interface 202 of the buyer device for making payments without having to use a payment provider App to pay a merchant having a standard POS device or server. Conveniently, the buyer does not have to spend extra time such as for opening an App, thus saving steps and making the transaction more reliable and with more probability of success. In other embodiments, this process may allow a buyer that does not have access to a smart mobile device (due to, for example, economic class or geography) and wants to use a payment provider, to use simple texting capabilities such as MMS over a cell signal that does not require much data, GPS, etc., to pay a merchant that has a standard POS device.

In another embodiment, a merchant may register a merchant device with a remote server such as a payment provider server and sign up for MMS payments as a product. In this case, as described above with respect to the embodiment for a buyer-side MMS transaction process, the buyer device may receive message content including an image from the payment provider server, where the image may include an image of a payment instrument such as a transaction card as illustrated in the example of FIG. 2, which shows a transaction card with information such as an account number, an expiration date, a card issuer, etc. The transaction card image may also include a digital certificate, and may have embedded data that may further secure the transaction. That is, in an embodiment, the digital certificate may be a one-time certificate embedded in the image, which may provide an additional level of security.

In this embodiment wherein the merchant device is registered for MMS payments, the merchant may provide the merchant's assigned MMS identifier as an MMS endpoint to the buyer, for example, the merchant may provide the merchant's MMS payment provider number (e.g., a 5-digit number, etc.), to the buyer in any convenient manner, for example, via a text, an email, a pop up window if supported, or by a simple in-person communication, for example, by simply telling the buyer the MMS number. The buyer may then communicate or send the message content including transaction card image information, which may include a digital certificate, directly to the merchant's MMS identifier (e.g., MMS number).

Referring back to FIG. 1, in block 119, in an embodiment where the merchant device is registered for receiving MMS payments, the buyer may provide the MMS image received from the remote server to the merchant, or directly to the merchant's MMS identifier (e.g., MMS number). In an embodiment, the buyer may communicate, send, transmit or forward the image via the buyer device to the merchant's assigned endpoint. In this process according to embodiments where the merchant also registers a merchant device and signs up for MMS payments as a product, MMS transaction solutions may be advantageous for example, in standard markets where buyers do not want to use a payment provider App to pay merchants. Also, this process may be advantageous in micro markets, for example, flea markets, carnivals, etc., where merchants do not have a POS device or normally transact in cash, or in developing economies where merchants do not have the capital to purchase a POS device.

In block 121, a remote server 108 associated with a payment provider may process the image and verify or approve the transaction. For example, the remote server may verify the amount, buyer device information, account information, the image, etc. For example, the remote server may compare the assigned MMS identifiers of the buyer and the merchant to account information maintained at the remote server in connection with the buyer or buyer device and the merchant or merchant device, respectively.

In block 123, the remote server associated with the payment provider may send confirmation of the transaction to the merchant device, and at block 125, the merchant device may receive the confirmation of the transaction.

In block 127, the payment provider may send confirmation of the transaction to the buyer device. In various embodiments, the remote server may send confirmation of payment to the buyer device and/or the seller device that payment has been received by notification via an App (if a smart device), email, text messaging, etc.

In block 129, the transaction is completed, for example, the payment is processed and transferred.

Figure 3:
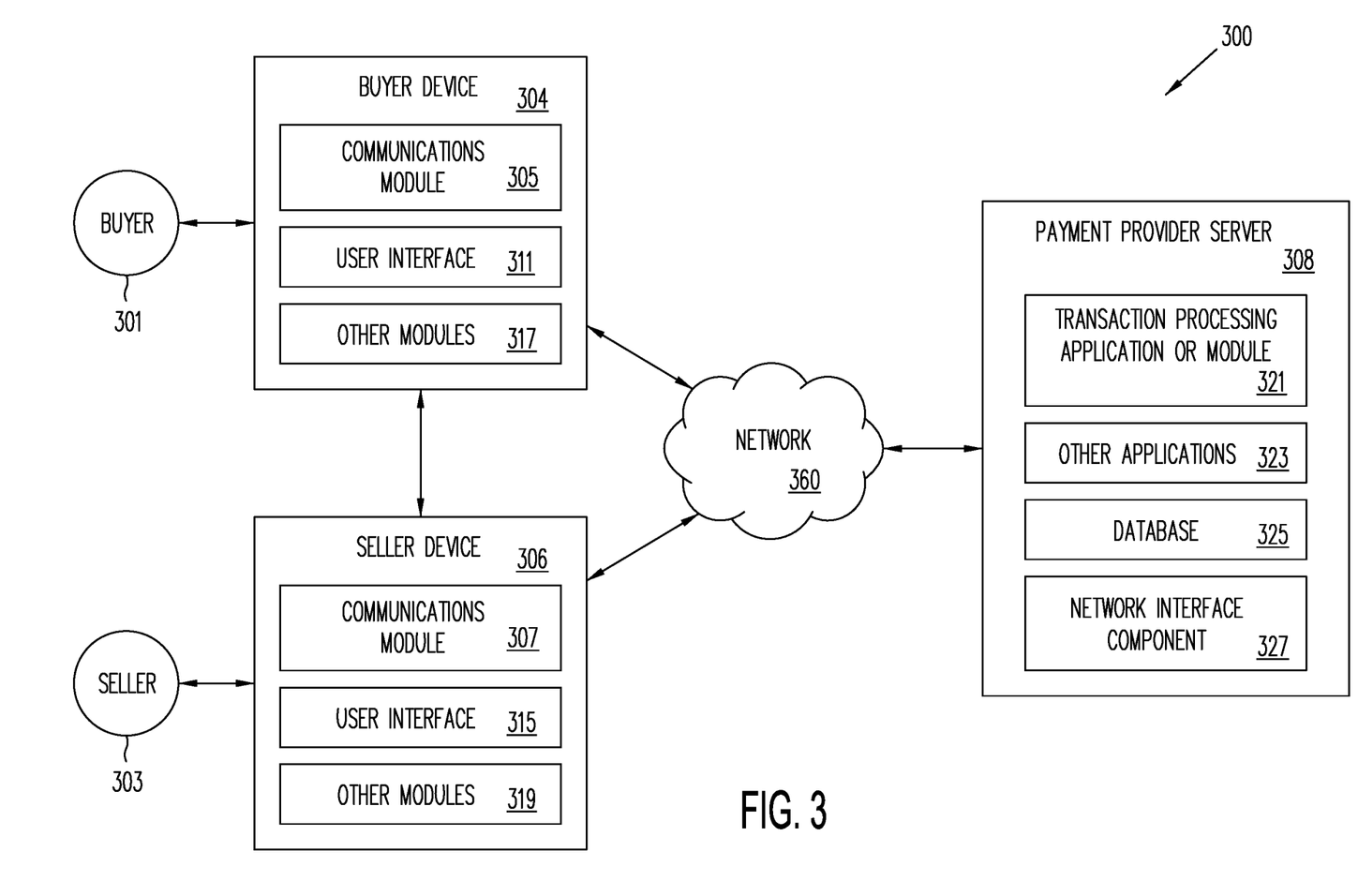
FIG. 3 is a block diagram illustrating a system for conducting image-based MMS transactions according to an embodiment of the present disclosure.

Referring now to FIG. 3, a block diagram of a system for conducting image based MMS transactions is illustrated according to an embodiment of the present disclosure. It should be noted that the system illustrated in FIG. 3 may be used to implement the process illustrated in FIG. 1 according to one or more embodiments.

As shown, a system 300 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 3 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 300 includes a buyer 301, a seller 303, a buyer device 304, a seller device 306, and a payment provider server 308 in communication over a network 360. Buyer 301 may utilize buyer device 304 to engage in transactions including payment transfers with seller 303 through seller device 306. Buyer 301 and seller 303 may utilize payment provider server 308 to complete the payment transfers between the buyer and the seller.

Buyer device 304, seller device 306, and payment provider server 308 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Buyer device 301 and seller device 306 may be implemented using any appropriate hardware and software configured for wired and/or wireless communication including cellular communications between buyer device 301, seller device 306, and/or payment provider server 308. For example, in one embodiment, buyer device 304 and/or seller device 306 may be implemented as a cellular telephone or any other device that may not have normal capabilities of a standard-market electronic computer device such as downloading, installing and running applications (Apps), location services such as GPS, etc. In another embodiment, buyer device 304 and/or seller device 306 may be implemented as a standard-market electronic computer device such as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a buyer device and a seller device are shown, the buyer device and the seller device may be managed or controlled by any suitable processing device. Although only one buyer device and one seller device are shown interacting, one or a plurality of buyer and/or seller devices may function similarly.

In an embodiment, buyer device 304 and seller device 306 may correspond to separate iterations of a similar user device utilized to engage in payment transfers between buyer 301 and seller 303. For simplicity, the components of buyer device 304 and seller device 306 are discussed together with respect to FIG. 3. However it is understood that implementations of buyer device 304 and seller device 306 may include the same, similar, and/or different components in various embodiments.

Buyer device 304 and seller device 306 of FIG. 3 include a communications module 305 and communications module 307, a user interface 311 and a user interface 315, other modules 317 and other modules 319, respectively. In other embodiments, buyer device 304 and seller device 306 may include additional or different components as required.

Buyer 301 may input payment account/financial information in connection with a transaction including an amount such as a total price for selected items through user input using an input device or user interface 311 of buyer device 304.

Communications module 305 and 307 may support various types of communications including messaging communications (e.g., text messaging, SMS/MMS messaging, instant messaging (IM), or other messaging service communications). Other types of supported communications include email communications, media content sharing communications, voice communications or any other types of notification communications through network 360. The various communication types implemented by communications module 305 and 307 may allow buyer 301 and seller 303 to communicate, interface, or otherwise correspond with other users, devices or servers. Incoming data or information may be received by communication module 305/307. Such data or information may be presented to buyer 301 and seller 303 through an output device of buyer device 304 and seller device 306, such as user interface 311/315, e.g., a display module. In various embodiments, communications module 305/307 is adapted to communicate with buyer device 304/seller device 306 and/or payment provider server 308 over network 360 and/or directly. Thus, communication module 305/307 may include a DSL (e.g., Digital Subscriber Line) modem, a PSTN (Public Switched Telephone Network) modem, an Ethernet device, a broadband device, a satellite device and/or various other types of direct wired and/or wireless network communication devices including mobile, telecommunications, cellular, microwave, radio frequency, infrared, Bluetooth, and near field communication components. Communication modules 305/307 may communicate directly with another nearby device using short range communications, such as Bluetooth Low Energy, LTE Direct, radio frequency, infrared, Bluetooth, and near field communications. Thus, communications module 305/307 may include various specialized short range communication modules that may connect with nearby devices.

In addition to displaying information or data relating to, for example, MMS data, images, etc. on a user interface 311/315, other information may include verification statuses for transactions. Processes may be executed to allow buyer 301 to conduct transactions with seller 303 in connection with one or more items such as making payments to seller 303 by using an input device such as user interface 311 of buyer device 304 to forward an MMS identifier obtained from an MMS endpoint implemented by seller 303 along with transaction information (e.g., an amount) to a remote server such as payment provider server 308. Buyer device 304 may receive MMS image data via communication module 305 displayed using an output display device of buyer device 304 having user interface 311, e.g., a display module, and initiate and communicate/transmit the MMS image data to a seller's assigned MMS endpoint using communication modules 305/307, as described above according to one or more embodiments. The transaction between buyer 301 and seller 303 including the image, amount, etc. may be verified and completed via a remote server such as payment provider server 308.

Thus, one or more processes may execute modules of buyer device 301 to provide a convenient interface to permit buyer 301 to conduct transactions including making payments to seller 303 and request a transfer of a payment amount to seller 303 via a remote server such as payment provider server 308. Seller 303 may provide an MMS identifier to buyer 301 such that seller 303 may receive payments via, e.g., seller device 306. In this regard, communications module 305/307 may execute one or more modules, such as a payment transfer module of buyer device 304 and seller device 306 utilized to present MMS images for payment transfers. An image may appear in the form of a payment instrument such as a transaction card, or as a notification, alert, icon, badge, or other signifier displayable to buyer 301 or seller 303 on user interface 311/315 such as an output display device of buyer device 304 or seller device 306. Payment accounts with payment provider server 308 or another financial account may be found as a result of buyer device 304 and/or seller device 306 being registered with payment provider server 308.

Buyer device 304 and seller device 306 may each include other applications or modules as may be desired in particular embodiments to provide features to buyer device 304 and seller device 306. For example, other modules 317/319 may include security modules or applications for implementing client-side security features, programmatic client applications or modules for interfacing with appropriate application programming interfaces (APIs) over network 360, or other types of applications or modules. In various embodiments, other modules 317/319 may include financial applications or modules, such as banking, online payments, payment or monetary transfer, or other applications or modules associated with payment provider server 308. Other modules 317/319 may include browser applications enabling buyer device 304 or seller device 306 to access websites and/or receive information from one or more online sources. Additionally, other modules 317/319 may include social networking/media application, including microblogging applications. Other modules 317/319 may include other software programs, executable by a processor, including a graphical user interface (GUI) configured to provide an interface to buyer 301 and seller 303.

Buyer device 304 and seller device 306 may further include a database which may include, for example, identifiers such as operating system registry entries, cookies associated with communications module 305/307 and/or other modules 317/319, identifiers associated with hardware of buyer device 304 and seller device 306, or other appropriate identifiers, such as identifiers used for payment/buyer or seller/device authentication or identification. In one embodiment, identifiers in the database may be used by a payment/credit provider, such as payment provider server 308, to associate buyer device 304 and seller device 306 with a particular account maintained by the payment/credit provider.

In various embodiments, the database may further include buyer and seller information data to access buyer and seller accounts, such as payment account information for a payment account with payment provider server 308. Thus, the database may include user (buyer and/or seller) personal information (e.g. a name, social security number, user financial information, or other identifying information), a user account identifier, and a user device identifier. In various embodiments, the database may include online account access information.

Payment provider server 308 may be maintained, for example, by an online payment service provider, which may provide payment service to a user such as a buyer and/or seller. In this regard, payment provider server 308 includes one or more processing applications, which may provide transfers between communication devices, such as buyer device 304 and seller device 306. In one example, payment provider server 308 may be provided by PAYPAL®, Inc. of San Jose, California, USA. However, in other embodiments, payment provider server 308 may be maintained by or include a merchant, financial services provider, and/or other service provider, which may provide payment services to buyer 301 and seller 303. Payment provider server 308 may additionally provide use of payment accounts for use in transferring payment values.

Payment provider server 308 of FIG. 3 includes a transaction processing application or module 321, other applications 323, a database 325, and a network interface component 327. Transaction processing application or module 321 and other applications 323 may correspond to processes, procedures, and/or applications executable by a hardware processor, for example, a software program. In other embodiments, payment provider server 308 may include additional or different software as required.

Transaction processing application or module 321 may execute one or more modules of payment provider server to receive and/or transmit information between buyer device 304 and seller device 306 for processing and completion of payment requests in connection with transactions for buyer 301 and seller 303. In this regard, transaction processing application or module 321 may be configured to receive and/or transmit information between buyer device 304 and seller device 306 for processing and completion of payment transfers. For example, transaction processing application or module 321 may include one or more applications to process a request for a transfer for a payment amount from buyer 301 to seller 303. Transaction processing application or module 321 may receive a request for a transfer of a payment amount from buyer device 304 and corresponding to seller device 303. The request may include the payment amount, an MMS identifier and any other applicable transaction details such as time, date, etc. Transaction processing application or module 321 may provide an image-based MMS that may include a form of payment instrument displayed on user interface 311 of buyer device 304, which buyer 301 may in turn send or forward to seller device 306, or simply show to seller 303. Transaction processing application or module 321 may verify and complete the request for the transfer of the payment amount using the image, amount and other application information. The request may correspond to sending the payment amount to seller 303; therefore, transaction processing application or module 321 may credit and post the payment amount to a user account and/or financial account of seller 303. Additionally, transaction processing application or module 321 may transmit a confirmation for example a notification to buyer 301 and seller 303 of the request, including the terms for the request (e.g. payment amount and transmission/due date) and/or messages included with the request. Transaction processing application or module 321 may provide transaction histories, including receipts, for use by buyer device 304 and/or seller device 306 to complete or retain a history of the payments.

In various embodiments, payment provider server 308 includes other applications 323 as may be desired in particular embodiments to provide features to payment provider server 308. For example, other applications 323 may include security applications for implementing server-side security features, programmatic server applications for interfacing with appropriate application programming interfaces (APIs) over network 360, or other types of applications. Other applications 323 may contain software programs, executable by a processor, including a graphical user interface (GUI), configured to provide an interface to a user.

Additionally, payment provider server 308 may include a database 325. As previously discussed, buyer 301 and/or seller 303 may establish one or more user accounts with payment provider server 308. In that regard, for example, buyer 301 may register buyer device 305 with payment provider server 308. Buyer 301 may then receive an MMS identifier that buyer 301 may leverage to conduct transactions such as making payments. Similarly, seller 303 may register seller device 306 with payment provider server 308 such that seller 303 activates an account for receiving MMS based payments. User account information (e.g., related to a buyer account and/or a seller account) in database 325 may include user information, such as name, address, payment/funding information including MMS identifier data, additional user financial information, and/or other desired user data. Buyer 301 and/or seller 303 may link respective user accounts to buyer device 304 and/or seller device 306 through a respective user device identifier, and according to one or more embodiments, to an MMS identifier. Thus, when an identifier such as an MMS identifier or a device identifier corresponding to buyer device 304 is transmitted to payment provider server 308, e.g. from buyer device 304, a user account belonging to buyer 301 may be found. Likewise, when an identifier such as an MMS identifier or a device identifier corresponding to seller device 306 is transmitted to payment provider server 308, e.g., from seller device 306, a user account belonging to seller 303 may be found. Database 325 may further store requests for payment transfers corresponding to buyer 301 and/or seller 30 and/or transaction history for completed payment transfers.

In various embodiments, payment provider server 308 includes at least one communication module (NIC) 327 adapted to communicate with network 360 including buyer device 304 and/or seller device 306. In various embodiments, network interface component 327 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks including cellular networks, and/or other appropriate types of networks. Thus, network 360 may correspond to small scale communication networks, such as a private or local area network, or a larger scale network, such as a wide area network or the Internet, accessible by the various components of system 300.

Figure 4:
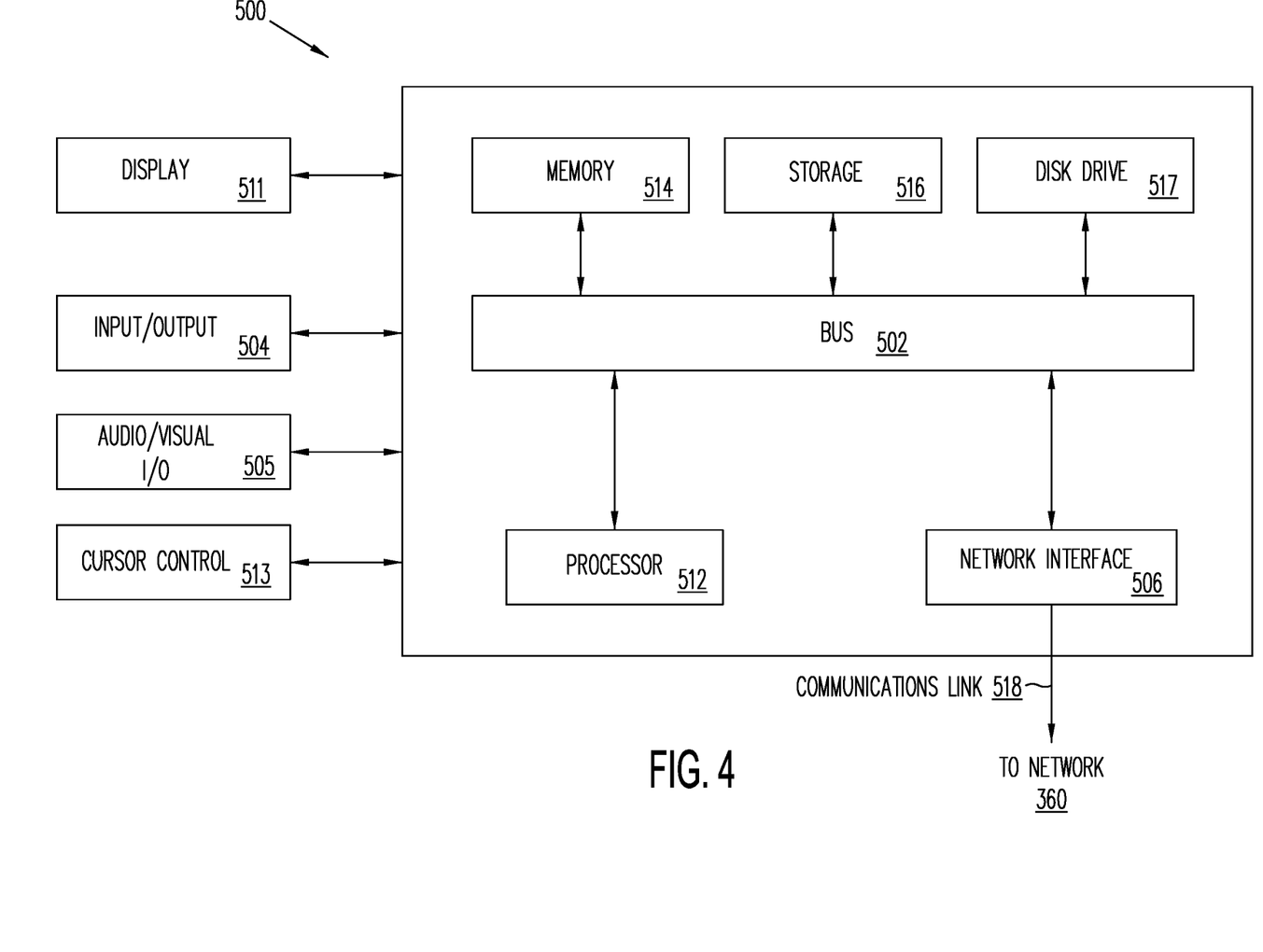
FIG. 4 is a block diagram of a computer system suitable for implementing one or more components in FIG. 3, according to an embodiment of the present disclosure.

FIG. 4 is a block diagram of a computer system suitable for implementing one or more components in FIG. 3, according to an embodiment. In various embodiments, a buyer device and/or a seller device may comprise a personal communication device. For example, in some embodiments, the personal communication device may be a smart phone, a computing tablet, a personal computer, laptop, PDA, Bluetooth device, key FOB, badge, etc.) capable of communicating with the network. In other embodiments, the personal communication device may be a simple device that may be capable of communicating with the network, but may not include all the capabilities of a standard market smart device, for example, a cellular device having MMS capabilities, but no capabilities for running Apps, GPS, etc. It should be appreciated that each of the devices utilized by users such as buyers or sellers and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another buyer device, a seller device, or a payment provider server via network 360. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   accessing, at a merchant device, transaction information for a transaction between a buyer and a merchant associated with the merchant device, wherein the merchant device utilizes cellular communications without running a payment provider application of a payment provider server for processing the transaction with the payment provider server;
   providing, by the merchant device, the transaction information and a multimedia messaging service (MMS) identifier of the merchant to a user device of the buyer, the MMS identifier configured to enable a user device of the buyer to communicate buyer data with an image indicating a payment instrument to the merchant device, and the MMS identifier usable to establish a connection with the merchant device and transmit the buyer data with the image indicating the payment instrument;
   receiving, at the merchant device and from the user device associated with the buyer via the cellular communications, the image indicating 1) the payment instrument, of the buyer, for use with the transaction and 2) the buyer data, wherein the buyer data indicates a registration of the user device with the payment provider server for providing authorized payments to at least the merchant;

determining, by the merchant device, a merchant endpoint assigned to the merchant by the payment provider server for processing transactions including those associated with the user device with the payment provider server using images;

communicating, by the merchant device to the merchant endpoint via the cellular communications, information including the transaction information, the image, and the MMS identifier to the payment provider server, wherein the MMS identifier validates the merchant device to the payment provider server;

receiving, by the merchant device from the payment provider server, an approval of the transaction based on using the payment instrument; and providing an indication of a confirmation of the transaction to the user.

2. The method of claim 1, further comprising:
registering, by the merchant device and prior to accessing the transaction information, the merchant device with the payment provider server for accepting authorized payment from registered user devices with merchant endpoints identified in respective buyer data of the user devices.

3. The method of claim 1, further comprising:
registering, by the merchant device and prior to accessing the transaction information, the merchant device with the payment provider server for accepting authorized payment from registered user devices without merchant endpoints identified in respective buyer data of the user devices, wherein the registering the merchant device further comprises receiving a seller endpoint identifier from the payment provider server for transactions with user devices without merchant endpoints identified in the respective buyer data of the user devices.

4. The method of claim 1, further comprising:
verifying, by the merchant device, the user device and the merchant device with the payment provider server for processing the transaction via the image indicating the payment instrument.

5. The method of claim 1, wherein the receiving the image comprises accessing, via an input/output module of the merchant device, the image from an MMS text message received from the user device.

6. The method of claim 1, wherein the receiving the image comprises receiving the image from the user device via short-range communication transmitted by the user device.

7. The method of claim 1, wherein the image comprises a code for a limited use account identifier of the payment instrument.

8. The method of claim 1, wherein the information uniquely identifies a payment provider account associated with the buyer and verifies the buyer is requesting a payment transfer in connection with the transaction.

9. A merchant device comprising:
a non-transitory memory storing instructions; and
a processor configured to execute the instructions to cause the merchant device to:
  access transaction information for a transaction between a buyer and a merchant associated with the merchant device, wherein the merchant device utilizes cellular communications independent of utilizing a payment provider application of a payment provider server for processing the transaction with the payment provider server;
  provide the transaction information and a multimedia messaging service (MMS) identifier of the merchant to a user device of the buyer, the MMS identifier configured to enable a user device of the buyer to communicate buyer data with an image indicating a payment instrument to the merchant device, and the MMS identifier usable to establish a connection with the merchant device and transmit the buyer data with the image indicating the payment instrument;
  receive, from the user device associated with a user via the cellular communications, the image indicating 1) the payment instrument of the user for use with a transaction between the user and the merchant and 2) the buyer data, wherein the buyer data indicates a registration of the user device with the payment provider server for providing authorized payments to at least the merchant;
  determine a merchant endpoint assigned to the merchant by the payment provider server for processing transactions including those associated with the user device with the payment provider server using images;
  communicate, to the merchant endpoint via the cellular communications, information including the transaction information, the image, and the MMS identifier to the payment provider server, wherein the MMS identifier validates the merchant device to the payment provider server;
  receive, from the payment provider server, an approval of the transaction based on the payment instrument; and
  finalizing the transaction with the user.

10. The merchant device of claim 9, wherein executing the instructions further causes the merchant device to register, prior to receiving the user data, the merchant device with the payment provider server for accepting authorized payment from registered user devices with merchant endpoints identified in respective user data of the user devices.

11. The merchant device of claim 9, wherein executing the instructions further causes the merchant device to register, prior to receiving the user data, the merchant device with the payment provider server for accepting authorized payment from registered user devices without merchant endpoints identified in respective user data of the user devices, wherein the registering the merchant device further comprises receiving a seller endpoint identifier from the payment provider server for transactions with user devices without merchant endpoints identified in the respective user data of the user devices.

12. The merchant device of claim 9, wherein executing the instructions further causes the merchant device to verify the user device and the merchant device with the payment provider server for processing the transaction via the image indicating the payment instrument.

13. The merchant device of claim 9, wherein the receiving the image comprises accessing, via an input/output module of the merchant device, the image from an MMS text message received from the user device.

14. The merchant device of claim 9, wherein receiving the image comprises receiving the image from the user device via short-range communication transmitted by the user device.

15. The merchant device of claim 9, wherein the image comprises a code for a limited use account identifier of the payment instrument.

16. A non-transitory machine-readable medium having instructions stored thereon, the instructions executable to cause performance of operations comprising:
accessing, at a merchant device, transaction information for a transaction between a buyer and a merchant associated with the merchant device, wherein the merchant device utilizes cellular communications independent of an availability of a payment provider application of a payment provider server for processing the transaction with the payment provider server;

providing, by the merchant device, the transaction information and a multimedia messaging service (MMS) identifier of the merchant to a user device of the buyer, the MMS identifier configured to enable a user device of the buyer to communicate buyer data with an image indicating a payment instrument to the merchant device, and the MMS identifier usable to establish a connection with the merchant device and transmit the buyer data with the image indicating the payment instrument;

receiving, at the merchant device and from the user device associated with the buyer via the cellular communications, the image indicating 1) the payment instrument, of the buyer, for use with the transaction and 2) the buyer data, wherein the buyer data indicates a registration of the user device with the payment provider server for providing authorized payments to at least the merchant;

determining, by the merchant device, a merchant endpoint assigned to the merchant by the payment provider server for processing transactions including those associated with the user device with the payment provider server using images;

communicating, by the merchant device to the merchant endpoint via the cellular communications, information including the transaction information, the image, and the MMS identifier to the payment provider server, wherein the MMS identifier validates the merchant device to the payment provider server;

receiving, by the merchant device from the payment provider server, an approval of the transaction based on the payment instrument; and providing an indication of the confirmation to the user.

17. The non-transitory machine-readable medium of claim 16, wherein the operations further comprise registering, prior to accessing the transaction information, the merchant device with the payment provider server for accepting authorized payment from registered user devices with merchant endpoints identified in respective buyer data of the user devices.

18. The non-transitory machine-readable medium of claim 16, wherein the operations further comprise registering, prior to accessing the transaction information, the merchant device with the payment provider server for accepting authorized payment from registered user devices without merchant endpoints identified in respective buyer data of the user devices, wherein the registering the merchant device further comprises receiving a seller endpoint identifier from the payment provider server for transactions with user devices without merchant endpoints identified in the respective buyer data of the user devices.

19. The non-transitory machine-readable medium of claim 16, wherein the receiving the image comprises accessing, via an input/output module of the merchant device, the image from an MMS text message received from the user device.

20. The non-transitory machine-readable medium of claim 16, wherein the receiving the image comprises receiving the image from the user device via short-range communication transmitted by the user device.

* * * * *

UNITED STATES PATENT AND TRADEMARK OFFICE
CERTIFICATE OF CORRECTION

PATENT NO. : 12,002,031 B2
APPLICATION NO. : 17/094588
DATED : June 4, 2024
INVENTOR(S) : Eduardo Alfonso Batlle

It is certified that error appears in the above-identified patent and that said Letters Patent is hereby corrected as shown below:

In the Claims

Claim 1, Column 15, Lines 13-14, change:
"provider server, an approval of the transaction based on using the payment instrument; and"
To:
--provider server, an approval of the transaction based on the payment instrument; and--

Claim 13, Column 16, Lines 50-51, change:
"The merchant device of claim 9, wherein the receiving the image comprises accessing, via an input/output module"
To:
--The merchant device of claim 9, wherein receiving the image comprises accessing, via an input/output module--

Signed and Sealed this
Tenth Day of December, 2024

Katherine Kelly Vidal
*Director of the United States Patent and Trademark Office*